United States Patent [19]

LaBounty

[11] 4,104,792
[45] Aug. 8, 1978

[54] WHEEL AND TIRE CUTTER

[76] Inventor: Roy E. LaBounty, 1607 - 8th Ave., Two Harbors, Minn. 55616

[21] Appl. No.: 760,840

[22] Filed: Jan. 21, 1977

[51] Int. Cl.² .......................... E02F 3/28; B23P 19/00
[52] U.S. Cl. ................................... 30/134; 214/147 R
[58] Field of Search ............. 214/147 R; 30/134, 258; 29/403, 427

[56] References Cited

U.S. PATENT DOCUMENTS

| 3,275,172 | 9/1966 | Smith | 214/147 R X |
| 3,550,655 | 12/1970 | Murphy | 214/147 R |
| 3,885,292 | 5/1975 | Sharp | 30/134 X |
| 3,972,097 | 8/1976 | Schakat | 214/147 R X |

*Primary Examiner*—Jimmy C. Peters
*Attorney, Agent, or Firm*—H. Dale Palmatier

[57] ABSTRACT

A grapple for a backhoe and having a cutter secured to the back side of the lower jaw of the backhoe, the cutter having stationary cutting anvils on the grapple jaw and a swingable cutter jaw to punch through the automobile wheel and shear through the rim flanges, tire and bead cables of the tire.

9 Claims, 4 Drawing Figures

WHEEL AND TIRE CUTTER

BACKGROUND OF THE INVENTION

Reprocessing of automobile bodies is important to the public interest because scrapped automobile bodies can supply a very substantial amount of steel which can be reused in the automobile and other steel industries. In addition, reprocessing is essential in order to prevent filling up the landscapes with the visual blight of steel scrap piles.

Because the profit potential for reprocessing of scrap steel is marginal, the automobile bodies and similar types of used materials must be very quickly and efficiently handled at the lowest possible cost.

The scrap iron industry has learned to crush automobile bodies and form them into compact bales, and to shred the automobile bodies into small pieces so that they may be more compactly stored and efficiently handled during the reprocessing procedures.

Automobile tires have continued to be a problem for the reprocessing industry because the rubber material in the tires constitutes a significant contaminant in the processing steps for the scrap steel. Accordingly, the tires from scrapped automobile bodies must be removed and otherwise handled.

In the past, no highly efficient method or apparatus has been devised for removing the tires from the automobile wheels, and, as a result, the common practice has been to remove the wheels from the automobile body and to discard the steel wheels together with the rubber tires because the tires have proven to be rather difficult to remove from the wheels. An excessive amount of hand labor has been required in order to remove the tires and, as a result, the scrap steel which is contained in the automobile wheels has been essentially lost.

SUMMARY OF THE INVENTION

As automobile bodies are collected and prepared for crushing, baling and shredding, the automobile bodies are often handled with a backhoe having an implement on the stick known as a grapple. The grapple has a pair of jaws to grasp and pick up the automobile bodies and place them in a crusher or conveyor, or other handling mechanisms. The grapple has a swingable upper jaw to grip and release such automobile bodies, and a lower jaw which is generally substantially stationary although it may be repositioned, according to the desires of the operator or the type of work being accomplished. The grapple, in most instances, will have heavy rigid tines which interleave with each other as the jaws are swung together so that objects of various large and small sizes can be picked up and efficiently handled.

The present invention relates to a cutter for removing tires from automotive type wheels as the wrecked automobile bodies are being handled in the yard as they are prepared for crushing, baling and shredding.

The cutter is mounted on and secured to the back side of the lower jaw of the grapple and performs a sequential punching and shearing action as the tire is cut away from the wheel. Initially the back side of the grapple jaw will be laid against the inner side of the automobile tire and the swingable jaw of the cutter will initially punch through the steel wheel. A pair of stationary cutter anvils on the grapple jaw receive the swingable jaw of the cutter therebetween so that a balanced shearing operation is effected as the swingable jaw is moved inwardly. The tire on the wheel is entirely cut through from the tread surface through the sidewalls and through the steel cables at the beads of the tire. In order to efficiently cut the sidewalls and beads of the tire, the cutter will cut through the rim flanges of the wheel. A slice or strip of the tire and of the rim flanges will be cut free of the tire by the dual cutting operation.

At one side of the cut in the tire, the tire will be gripped by the cutter jaws so that as the grapple and stick is swung away from the wrecked automobile body, the tire which has been cut will be pulled away from the steel rim. Accordingly, the operator of the backhoe will utilize the grapple to turn the automobile body over so that the wheels extend upwardly and are accessible, and then in rapid succession will cut through each of the four tires and wheels of the wrecked automobile and swing the tires out of the way so that the body may then be advanced to the next stage of its crushing, baling and shredding in the reprocessing.

DETAILED DESCRIPTION OF THE INVENTION

Figure 1:
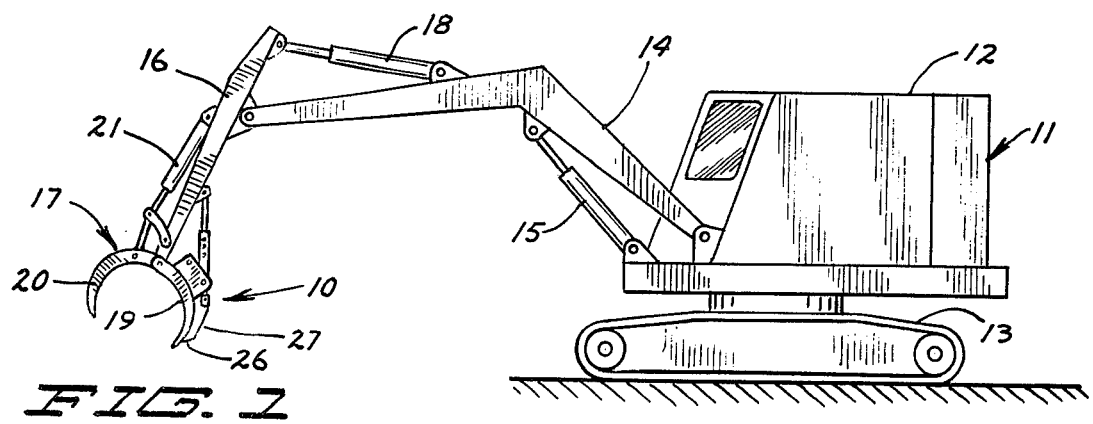
FIG. 1 is an elevation view of the present invention applied to the grapple of a backhoe.

One form of the invention is illustrated in the drawings and described herein. The tire removing apparatus is indicated in general by numeral 10, and is to be used in connection with a backhoe 11 having a swinghouse 12 which revolves under its own power about a vertical axis relative to the supporting track 13. A boom 14 is mounted on the swinghouse 12 for vertical swinging and the position thereof is controlled by a hydraulic cylinder 15. A stick 16 is pivotally mounted on the boom 14 for raising and lowering an implement indicated in general by numeral 17, and the stick is swung and controlled by a hydraulic cylinder 18.

The implement 17 comprises a grapple having a substantially stationary lower jaw 19 and a swingable upper jaw 20 the position of which is controlled by hydraulic cylinder 21.

Figure 2:
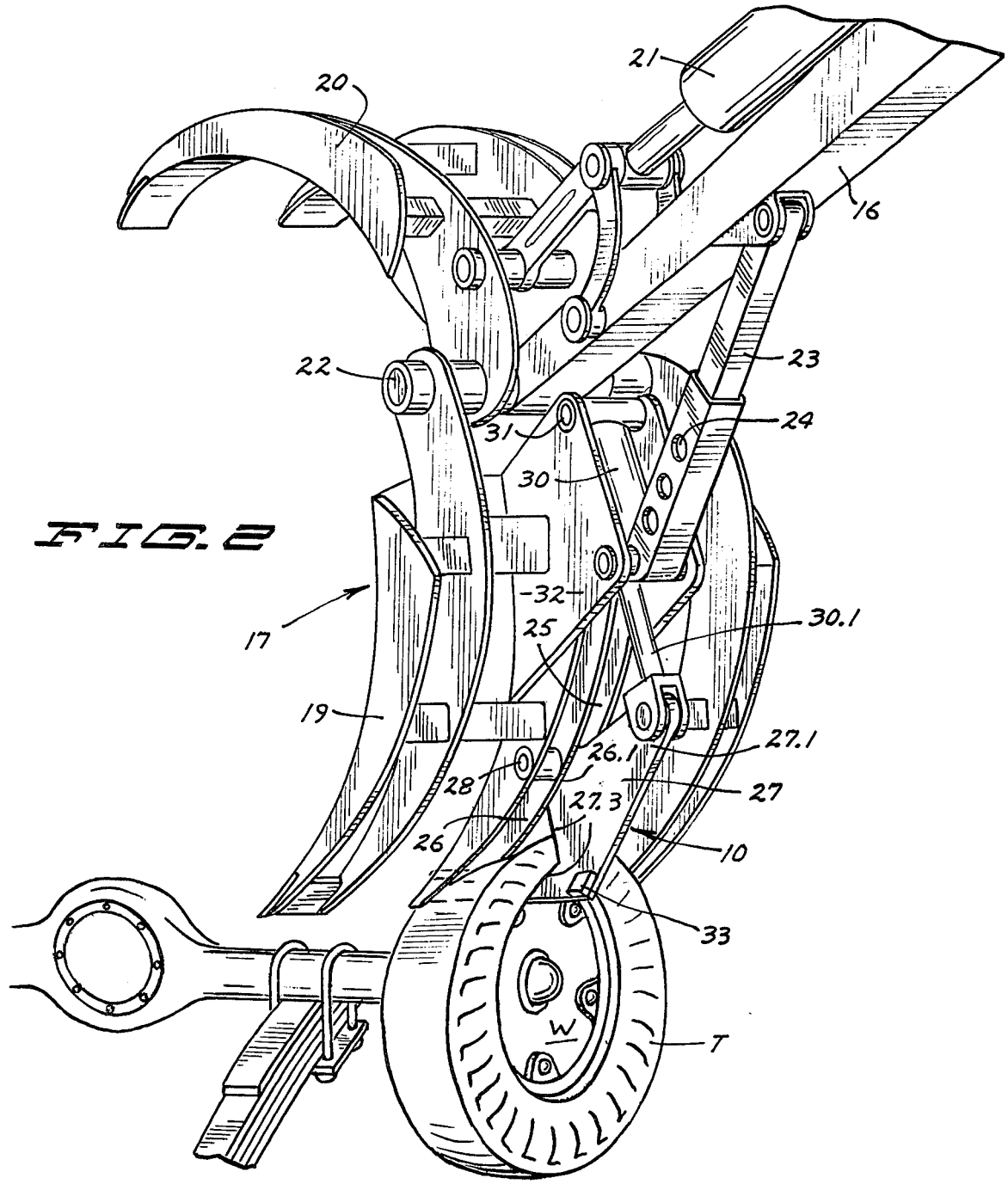
FIG. 2 is an enlarged perspective view of the apparatus.

It will be seen in FIG. 2 that both the lower jar 19 and the upper jaw 20 are formed with rigid tines which interleave with respect to each other as the jaws 19 and 20 are closed relative to each other so that objects of both large and small size may be gripped.

The lower jaw 19 is mounted upon the same pivot 22 which carries the upper jaw, and is affixed relative to the stick 16 by an adjustable brace or strut 23 which is in a two part telescoping construction, the two parts of which may be affixed in desired position relative to each other by a knockout pin 24.

The tire removing apparatus 10 includes a pair of stationary steel anvil plates 25 and 26 which are affixed as by welding 27 to the back and lower sides of the center tine 19a of the lower grapple jaw 19. The anvil plates 25 and 26 have working faces 25.1 and 26.1, and the plates 25 and 26 are spaced from each other to receive the shear blade 27 therebetween in close fitting relation. The anvil plates 25 and 26 have cutting edges 25.2 and 26.2 along the inner sides of the working faces. The lower ends of the cutting edges 25.2 and 26.2 extend obliquely of a radius from the pivot 28 to define points 25.3, 26.3. The lower edges or faces 29 of the anvil plates extend or lie sharply angularly with respect to the working faces so that the points 25.3, 26.3 have a substantial and distinct angular form.

The swingable shear blade 27 is mounted on the pivot 28 and lies between the two anvil plates 25 and 26 to swing therebetween. The corner portion 27.1 of the shear blade is secured to the rod 30.1 of a hydraulic cylinder 30 which is mounted on a pivot 31 to the mounting plates 32 which are affixed as by welding to the center tine 19a of the lower grapple jaw. As the hydraulic cylinder is actuated, the shear blade 27 swings about the pivot 28 in a shearing action relative to the anvil plates 25, 26.

The shear blade 27 also has a working face 27.2 which has a somewhat angular shape, and defines shear edges 27.3 on both sides thereof. The working face 27.2 and the shear edges 27.3 are both obliquely oriented, adjacent the lower end of the shear blade 27, so as to extend obliquely of a radius from pivot 28 and define a point 27.4 which confronts and points toward the anvil plates.

The bottom face 27.5 of the shear blade is oriented in an acute angular relationship with respect to the lower portion of the face 27.2 so as to assure an acute angular relationship at the point 27.4.

The shear blade 27 also has a rigid clamping lug 33 affixed as by welding on one side thereof and in confronting relation with the working face 26.1 of the anvil plate 26. It will be seen that the lug 33 is spaced back from the front working face 27.2 of the shear blade to allow the lower portion of the blade to swing substantially between the anvil plates 25, 26 before the lug 33 converges into substantially abutting relation with respect to the plate 26.

Figure 3:
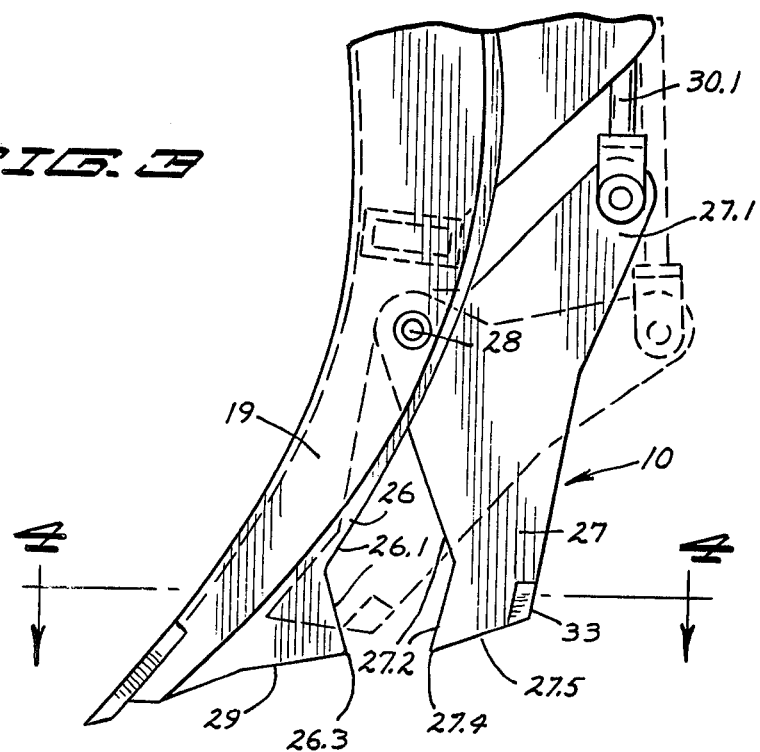
FIG. 3 is an enlarged detailed elevation view of the apparatus.
Figure 4:
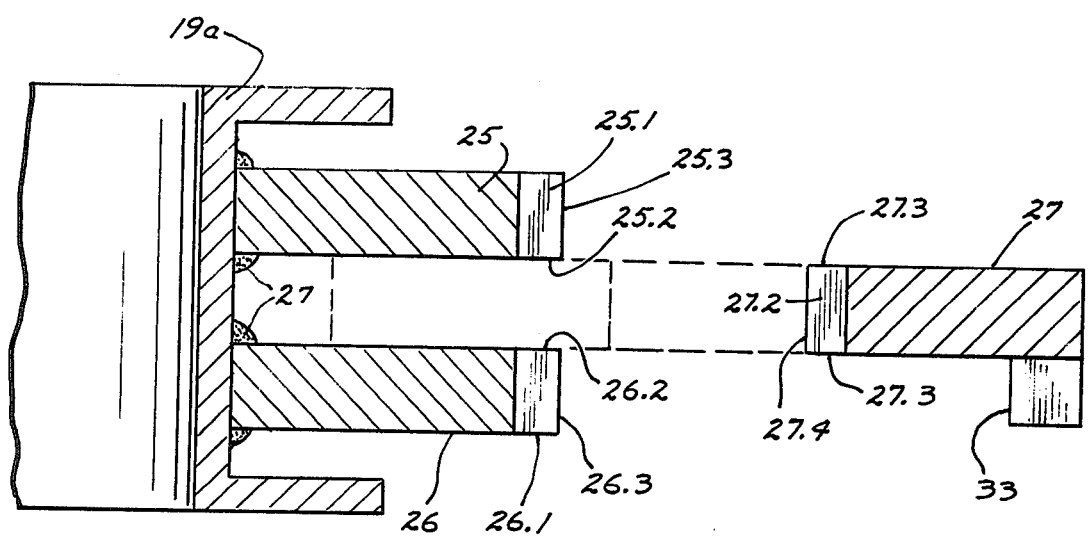
FIG. 4 is an enlarged detailed section view taken approximately at 4—4 in FIG. 3.

It will be seen in FIG. 3 that the lower ends of the shear edges 25.2, 26.2 and 27.3 of the anvil plates and shear blade respectively, oriented in oblique relationship to each other and converge in a downward direction so that the points 26.3 and 27.4 are the first portions of the anvil plates and shear blade which approach each other.

In operation, it should be understood that wrecked automobile bodies are delivered to a processing plant by truck or by rail car and are unloaded with substantial disorder into a large heap. The backhoe 11 is used to pick up individual automobile bodies and deliver them to the receiving station for crushing, baling or shredding.

In order to quickly and efficiently remove the tires from the wrecked automobile body, the body will be turned over onto its top side so that the tire T and wheels W are fully exposed in an upward direction, thereby allowing ready access to the wheels. The grapple 17 is used to accomplish the moving of the automobile body, and, of course, by manipulation of the stick and boom and swinghouse of the backhoe, the wrecked automobile body can be pushed around and deposited as desired.

Immediately upon releasing the wrecked automobile body, the stick 16 of the backhoe will be manipulated so that the back side of the lower jaw 19 will come to bear against the inside of one of the automobile wheels, At this time, the shear blade 27 will have been swung open by operation of hydraulic cylinder 30 so that the tire tread will be received in the space between the anvil plates 25, 26 and the shear blade 27, substantially as illustrated in FIG. 2. The shear blade 27 is thereafter swung inwardly by operation of hydraulic cylinder 30, in such a manner that the point 27.4 is directed inwardly toward the wheel at a location radially inwardly from the steel rim flange. The points 25.3 and 26.3 will be at the opposite side of the wheel, and the lower oblique portions of the working faces 26.1, 25.1 and 27.2 of the anvil plates and shear blade will guide with a cam-like action along the rim flange of the tire. The points 25.3, 26.3 and 27.4 of the anvil plates and shear blade will substantially simultaneously apply great pressure to opposite sides of the steel wheel, and will punch through the steel of the autmobile wheel, and the slicing through the rim flange and tire will commence. It will be quite obvious from the shape of the working faces of the anvil plates and shear blade that the rim flange and tire of the wheel cannot escape from the cutting action, and after substantial pressure is applied through operation of the hydraulic cylinder 30, the rim flange of the wheel and the entire tread and sidewall of the tire, including the steel cables at the beads on the tire sidewalls, will be entirely cut through. Because cutting is going on at both sides of the shear blade 27, a strip of tire will be actually cut out.

When the shearing action and cutting of the rim flange and tire has been completed, the tire is substantially loosened from the wheel, but the lug 33 will have swung against the tire sidewall and press the tire firmly against the opposite anvil plate 26 so as to clamp the tire against the anvil plate. By raising the stick 16 and lower jaw 19, the tire T is pulled off the wheel in severed condition, and the tire may thereupon be dropped and the processing of the automobile body will continue with immediate removal of the remaining tires on the body. It will be understood that removing of each of the tires consumes less than a minute and the entire processing of the vehicle body can be completed very promptly.

It will be recognized that because the swinging shear blade 27 is working between two stationary anvil plates 25 and 26 which are extremely rigid, there is no tendency of the swinging shear blade 27 to swing to one side or the other, and, accordingly, the tire cutting and removing apparatus used in conjunction with this grapple will withstand the normal strains encountered in the operation for a substantial period of time without undue wear to the bearings, pivots and edges.

It will be noted that the oblique lower portions of the working faces of the anvil plates and shear blade act like hooks which attach themselves firmly to the wheel adjacent the rim flange at a time prior to the application of great pressure which eventually results in punching through the wheel. Because the working faces of the anvil plates and shear blade attach themselves to the wheel prior to the start of cutting, there is no tendency for the cutting apparatus to slip away from the wheel and tire, but as cutting continues, the working faces and edges of the anvil plates and shear blade attach themselves all the more firmly to the tire, rim and wheel face.

It will be seen that I have provided a new and improved tire removing apparatus for quickly severing the tire, wheel flange and wheel face from a wrecked automobile body and cause the tire to be gripped and pulled off and swung away from the body to allow processing to rapidly continue.

What is claimed is:

1. Apparatus for handling scrap metal and especially for use in removing tires and handling and reprocessing wrecked automobile bodies, comprising:
   a backhoe grapple having an upper jaw and a lower jaw,
   a shear for slicing through such tires including a pair of stationary cutting anvils affixed on the back side of the lower jaw of the grapple, and
   a swinging shear blade mounted between such cutting anvils and swinging therealong and independently of said upper jaw and with a shearing action.

2. Apparatus for handling scrap metal and especially for use in removing tires and preparing wrecked automobile bodies for reprocessing, comprising:
   a backhoe grapple having a lower jaw and a swingable upper jaw,
   a shear for slicing through such tires including a pair of stationary anvil plates spaced from and confronting each other and affixed on the back side of the lower jaw of the grapple, such anvil plates having substantially parallel cutting edges lying adjacent each other, and
   a swingable shear blade mounted on a pivot on the lower jaw and swinging independently of the upper jaw and between such cutting anvil plates and cooperating with the cutting edges thereof in a shearing action, the blade having power-operated means to produce the swinging.

3. The tire removing apparatus according to claim 2 wherein the shear blade has a pointed lower end spaced from the pivot and extending toward the anvil plates to punch through the tire mounting wheels of the automobile bodies.

4. The tire removing apparatus according to claim 2 wherein the anvil plates have pointed lower ends spaced from the pivot and extending toward the shear blade to punch through the tire mounting wheels pushed thereagainst by the shear blade.

5. The tire removing apparatus according to claim 2 wherein the shear blade has a working face defining shear edges, the cutting edges of said anvil plates and the shear edges of said shear blade both extending obliquely to a radius from the pivot and extending convergently of each other to define points on the anvil plates and shear blade extending toward each other to punch through the tire mounting wheels and cut the tires and rim flanges.

6. The scrap metal handling apparatus according to claim 2 and the lower jaw having a distal end, and said shear including the anvil plates, pivot and shear blade, being mounted on the distal end of the lower jaw.

7. Apparatus for use in preparing wrecked automobile bodies for reprocessing and including simultaneous removing of the tires, comprising:
   ground support means, an elongate boom structure to reach out a substantial distance horizontally from said ground support means, and said boom structure having an outer end, means mounting said boom structure on said ground support means for swinging about horizontal axes in order to raise and lower the boom structure and about a vertical axis for swinging the boom structure from side to side,
   a backhoe grapple on the outer end of the boom structure and having a lower jaw and an upper jaw on a pivot to swing toward and away from the lower jaw, the lower jaw having obverse and reverse sides, the obverse side confronting the upper jaw, the grapple being provided with means for swinging said upper and lower jaw,
   a shear for slicing through such tires and being mounted on the reverse side of said lower jaw adjacent the distal end thereof, the shear including a pair of shearing elements cooperating with each other to punch through a steel automobile wheel and cut through the wheel rim and tire thereon, one of said shearing elements including a pair of stationary anvil plates spaced from and confronting each other and affixed on the reverse side of said lower jaw, such anvil plates having substantially parallel cutting edges lying adjacent each other and extending generally along the lower jaw toward the distal end thereof and from a pivot connecting said shearing elements together, the other of said shearing elements comprising a swingable shear blade mounted on said pivot and swinging independently of said upper jaw, the shear blade being disposed between such cutting anvil plates and cooperating with the cutting edges thereof in a shearing action, one of said shearing elements having a pointed lower end spaced from the pivot and extending toward the other of the shearing elements to punch through the tire mounting wheels when closed and to simultaneously shear the steel wheel and the tire mounted thereon.

8. The invention according to claim 7 and said boom structure including a generally outardly extending boom, and a swingable stick depending from the outer end of the boom, said backhoe grapple being mounted on the distal end of the stick and said lower jaw extending transversely of the stick and outwardly therefrom.

9. The tire removing apparatus according to claim 7 wherein the shear blade has a working face defining shear edges, the cutting edges of the anvil plates and the shear edges of the shear blade both having end portions extending obliquely to a radius from the pivot and extending convergently of each other to define points extending toward each other to punch through and cut the tire mounting wheels and tires as the shear blade is swung toward said anvil plates, and
   a clamping lug on one side of the shear blade and spaced behind said working face in confronting relation with one of the anvil plates to cooperate with such plate in clamping the tire facilitating removal of the tire from the wheel after the tire is cut.

* * * * *